United States Patent
Ogata et al.

(10) Patent No.: US 6,461,991 B1
(45) Date of Patent: Oct. 8, 2002

(54) ALUMINA-MAGNESIA-GRAPHITE REFRACTORY

(75) Inventors: Koji Ogata, Fukuoka (JP); Shoji Iitsuka, Fukuoka (JP)

(73) Assignee: Krosaki Corporation, Kitakyushu (JP)

(*) Notice: Subject to any disclaimer, the term of this patent is extended or adjusted under 35 U.S.C. 154(b) by 0 days.

(21) Appl. No.: 09/601,001

(22) PCT Filed: Jan. 25, 1999

(86) PCT No.: PCT/JP99/00304

§ 371 (c)(1),
(2), (4) Date: Aug. 24, 2000

(87) PCT Pub. No.: WO99/38818

PCT Pub. Date: Aug. 5, 1999

(30) Foreign Application Priority Data

Jan. 28, 1998 (JP) ............................................. 10-016123

(51) Int. Cl.⁷ ........................ C04B 35/035; C04B 35/04; C04B 35/10

(52) U.S. Cl. .................. 501/99; 501/100; 501/101; 501/104; 501/105; 501/108; 501/119; 501/120; 501/121; 501/125; 501/127

(58) Field of Search ........................... 501/99, 100, 101, 501/104, 105, 108, 119, 120, 121, 125, 127, 153; 252/62

(56) References Cited

FOREIGN PATENT DOCUMENTS

JP        06287057      * 10/1994

* cited by examiner

*Primary Examiner*—Paul Marcantoni
(74) *Attorney, Agent, or Firm*—Jordan and Hamburg LLP

(57) ABSTRACT

A re-usable alumina-magnesia graphite refractory suitably used for a refractory for continuous casting, such as a long nozzle used for pouring a molten metal from a ladle capable of re-use or intermittent use to a tundish, an immersion nozzle used for charging a molten metal from a tundish to a mold and a long stopper for controlling the flow rate of the molten steel; and produced by blending 3 to 60 wt % of magnesia having a particle size of 0.02 to 1.0 mm to a compound comprising mainly alumina and graphite, and kneading, molding, and baking the compound. The raw material compound comprising mainly alumina and graphite can contain spinel or zirconia.

3 Claims, No Drawings

ALUMINA-MAGNESIA-GRAPHITE REFRACTORY

TECHNICAL FIELD

The present invention relates to an alumina-magnesia-graphite refractory. In particular, the present invention relates to a reusable alumina-magnesia-graphite refractory which is suitably applied to refractory products for continuous casting, such as a long nozzle which is used for pouring a molten metal from a ladle into a tundish, a submerged nozzle which is used for pouring the molten metal from the tundish into a mold, and a long stopper which controls a flow rate of the molten steel.

BACKGROUND ART

In recent years, refractory products for continuous casting require to be a long life material excellent in corrosion resistance in order to reduce unit consumption and unit cost. Alumina-graphite refractories have been used as desirable refractories which fulfill these requirements.

For example, in practical applications of such a refractory product for continuous casting, it is gradually accepted as a common way that a long nozzle or a long stopper is saved after completing a casting operation and then reused for another casting operations, even though these nozzle and stopper were heretofore replaced with new one on each casting operation.

However, such refractory product after worked under thermal load from molten steel causes deterioration in physical properties, specifically in thermal shock resistance, compared to that in its initial use.

Japanese Patent Publication No. Sho 47-49409 discloses an alumina-graphite refractory as one refractory having an improved thermal shock resistance for use in a long nozzle and a long stopper for continuous casting, wherein a fused silica having a small thermal expansion properties is added, and this refractory has been commonly used. However, when an amount of the added fused silica is increased in order to prevent a deterioration of thermal shock resistance for reuse, a problem of a deterioration of corrosion resistance is brought out, because the fused silica is easily corroded by a slag.

An alumina-graphite refractory being free of fused silica shows excellent corrosion resistance, while its elastic modulus is increased due to mutually sintered alumina particles caused by thermal load from received molten steel, resulting in a deteriorated thermal shock resistance and its thermal shock resistance is essentially not so high due to its large thermal expansion coefficient. Thus, on reuse of this type of refractory, a problem causing cracks or shakes is more easily coming out than the case of initial use of a new refractory product.

In this specification, the word of "reuse" does not include usually a case of storing temporarily a long nozzle or long stopper under a condition of heat insulation after a casting operation until a next casting operation before complete cooling. This is referred as "Intermittent Use" which should be in distinction from "reuse", strictly.

Even under the intermittent use, there is, however, caused a problem similar to that in reuse because the long nozzle or long stopper which worked under a severe thermal load through a casting operation causing large thermal shock during an initial stage of a following casting operation.

The reuse or intermittent use of long nozzles and long stoppers is not common in submerged nozzles. However, in some cases where different kinds of steels are continuously cast, at a time when several minutes passes after a submerged nozzle has been pulled up out of a mold, the submerged nozzle is used again. In this case, the submerged nozzle is left standing to cool during the interrupted operation. Thus, when the submerged nozzle receives molten steel again, the submerged nozzle would be used under the substantially same condition as the intermittent use condition of a long nozzle.

Among various refractory materials, magnesia particularly has a high melting point and is thereby excellent in corrosion resistance. In addition, magnesia is a relatively inexpensive material and thereby economically useful. However, magnesia has an extremely large thermal expansion coefficient compared to alumina. Thus, when the amount of magnesia added to a refractory is increased, thermal expansion coefficient of the refractory is increased, resulting in a deteriorated thermal shock resistance of the refractory. Consequently, magnesia-graphite refractories are applied only to specific regions, such as a protection sleeve of a temperature measuring probe having a small sleeve shape which is advantageous to restraining occurrence of thermal shock as disclosed in "Refractories" 48 [11] 606 (1996), or fitting portions of stopper heads and fitting portions of nozzles wherein slim thermal shock is occurred as disclosed in "Refractories" 48 [11]608 (1996).

An alumina-graphite material including added magnesia has been known. For example, Japanese Patent Laid-Open Publication No. Sho 58-120569 discloses an alumina-graphite material wherein magnesia is added by 35 to 70% in order to prevent a non-metallic inclusion, such as alumina, from being attached to a refractory product. Japanese Patent Laid-Open Publication No. Sho 61-232266 and Japanese Patent Laid-Open Publication No. Sho 61-215251 also disclose an alumina-graphite material wherein magnesia is added by 0.1 to 5.0%, and Japanese Patent Laid-Open Publication No. Sho 59-3069 discloses an alumina-silicon carbide-carbon material wherein magnesia is added by 0.5 to 4.0%.

However, in these known alumina-graphite materials, magnesia is added to act as a sintering aid of alumina and thereby leads to increase elastic modulus. Accordingly, these materials are fundamentally inappropriate to reuse.

Thus, the conventional alumina-graphite materials including added magnesia cannot avoid a deterioration of corrosion resistance and thermal shock resistance in reuse and intermittent use.

DISCLOSURE OF INVENTION

It is an object of the present invention to provide an alumina-magnesia-graphite refractory which has a low deterioration of corrosion resistance and thermal shock resistance under a reuse condition and thereby allows reuse or intermittent use.

As the result of studying an effect of adding magnesia to an alumina-graphite refractory, it has been found that the refractory was improved in corrosion resistance by using a particular grain size of magnesia. It has been also found that a void was also created around the magnesia through thermal load by defining the added amount within a particular range, wherein the void made a contribution to an improvement of thermal shock resistance so that a deterioration level in reuse of the refractory could be minimized.

When suffering thermal load from received molten steel, conventional alumina-graphite refractories are generally deteriorated in thermal shock resistance to a large degree due to significantly increased elastic modulus caused by mutually sintered alumina particles. In contrast, when the alumina-graphite refractory including the added magnesia receives thermal load during a casting operation, the added magnesia is deoxidized by a surrounding carbon and a resulting gaseous metallic magnesium then creates a spinel by reacting with a surrounding alumina. During this reaction, the void is created around the magnesia grains. This void manifests a buffering function to stress so that the elastic modulus of the refractory is restrained to increase. In addition, the spinel created around the void prevents that strength of the refractory is reduced in connection with the created void so that a ratio of strength to elastic modulus may become larger and thermal shock resistance may resultingly be improved.

For improving durability of a long nozzle and a long stopper, corrosion resistance of the long nozzle or long stopper portion corresponding to a slag level should be enhanced. Since an inner wall of a tundish is generally provided with a coating layer including magnesia, some magnesia is inevitably contained in a slag. In this background, it has been found that the addition of magnesia was advantageous to improving corrosion resistance of the long nozzle/long stopper because a difference in magnesia concentration between the slag and the long nozzle/long stopper was reduced by the addition so that the long nozzle/long stopper may be delayed in melting into the slag. Then, it has also been found that an improved alumina-magnesia-graphite refractory was provided by adding magnesia having a particular grain size, specifically from 0.02 mm or more to 1.0 mm or less. The refractory was significantly improved in corrosion resistance which is well balanced with thermal shock resistance.

A first invention of the present application is an alumina-magnesia-graphite refractory formed by a process comprising; mixing 3% to 60% by weight of magnesia having a grain size of 0.02 to 1.0 mm with a mixture comprised primarily of alumina and graphite, and mixing, shaping and burning the resulting mixture.

In the case where the grain size of the mixed magnesia is less than 0.02 mm, the void created around the magnesia grains gets smaller so that the function for reducing elastic modulus is weakened. Besides, the created spinel is spread out over a matrix of the formed product, resulting in increased elastic modulus. In parallel, smaller grain size, less effect on improving corrosion resistance.

On the other hand, in the case where the grain size of the mixed magnesia is greater than 1.0 mm, this likely has a favorable effect on corrosion resistance, but an increase thermal expansion is provided to the alumina-magnesia-graphite refractory due to large heat expansion which is an inherent drawback of magnesia, resulting in a deteriorated thermal shock resistance.

For obtaining sufficient effect from the added magnesia, at least 60% by weight of the added magnesia preferably has a grain size in the aforementioned range of grain size.

The added magnesia is mixed with the mixture comprised primarily of alumina and graphite in an amount of 6 to 60% by weight, preferably 10 to 50% by weight. In the case where the added magnesia is less than 6% by weight, the void created around the magnesia by thermal load from received molten steel gets smaller so that the function for restraining the increase of elastic modulus is weakened. On the other hand, in the case of greater than 60% by weight of the added magnesia, the amount of alumina and graphite is relatively reduced so that thermal expansion is increased, resulting in a deteriorated thermal shock resistance.

Any suitable materials, such as electromelting materials or sintering materials, may be applied as magnesia material used in the present invention. The necessary conditions are fulfilled by 90% or more by weight of MgO purity. However, it is undesirable to prepare MgO purity in less than 90% by weight, because impurities, such as $SiO_2$ or CaO, are increased and the impurities react with alumina material to create a low melting material which causes a deterioration of corrosion resistance. The magnesia having 97% or more by weight of MgO purity is desirable to provide a refractory excellent in corrosion resistance.

A purity of alumina is preferably 90% or more by weight, more preferably 97% or more by weight. A mixing rate of alumina to the mixture is preferably to be from 10 to 80% by weight. It is undesirable to prepare the alumina in less than 10% by weight of the mixing rate, because the amount of mixed alumina is insufficient to the amount of added magnesia so that the spinel is insufficiently created and inadequate effect of the present invention can resultingly be obtained. In case of greater than 80% by weight of the mixing rate, thermal shock resistance is deteriorated. Available grain size of alumina is to be in the range of 0.5 $\mu$m to 1 mm. In the case of less than 0.5 $\mu$m of alumina grain size, a texture of the refractory is exceedingly densified so that thermal shock resistance is deteriorated, while greater than 1 mm of alumina grain size causes a deteriorated strength.

Any suitable materials, such as flaky crystalline graphite, amorphus graphite, artificial graphite, Kish graphite, crushed graphite electrode scrap, expanded graphite, and flaked expanded graphite, having purity of 85% or more by weight, preferably 95% or more by weight, can be applied as the aforementioned graphite. A mixing rate of graphite to the mixed material is preferably to be from 10 to 40% by weight. In case of less than 10% by weight of the mixing rate, thermal shock resistance is deteriorated, while greater than 40% by weight the mixing rate causes an extremely deteriorated erosion resistance. A grain size of graphite is preferably to be from 0.01 to 1 mm. In the case of less than 0.01 mm of graphite grain size, less effect on improving thermal shock resistance can be obtained, while greater than 1 mm of graphite grain size causes an extremely deteriorated strength.

The present invention constitutes features of adding magnesia into basic components comprising alumina, and graphite. However, even if a mixture formed of alumina and graphite includes spinel or zirconia, this mixture can also be applied as the basic components.

Spinel particularly provides an excellent corrosion resistance against a slag having a high basicity and the characteristic is superior to that of alumina. Thus, an alumina-spinel-graphite refractory provides an excellent corrosion resistance. However, as with the alumina-graphite refractory, sintering is caused among alumina, among spinel, or between alumina and spinel by heat load from received molten steel. Thus, elastic modulus is increased to a large degree so that thermal shock resistance is extremely deteriorated. A refractory wherein magnesia is added to this alumina-spinel-graphite refractory has an improved thermal shock resistance and is thereby suitable for operations under high basicity of slag.

So-called common spinel composed of 28.3% by weight of MgO and 71.7% by weight of $Al_2O_3$ may be applied as spinel of the present invention as well as magnesia-rich spinel wherein MgO is included by greater than 28.3% by weight or alumina-rich spinel wherein $Al_2O_3$ is included by greater than 71.7% by weight. It may be desirable to prepare a spinel having a high purity given by summing $Al_2O_3$ and MgO contents. In particular, a spinel having 97% by weight of the purity is desirable because of its excellent in corrosion resistance. A mixing rate of spinel is preferably to be 60% or less by weight. In the case of greater than 60% by weight of spinel, the amount of alumina is relatively reduced so that insufficient spinel is created by reacting alumina and magnesia and inadequate effect of the present invention can resultingly be obtained. Besides, thermal shock resistance is deteriorated due to a reduced amount of graphite.

Available grain size of spinel is to be in the range of 0.5 $\mu$m to 1 mm. In the case of less than 0.5 $\mu$m of spinel grain size, a texture of the refractory is exceedingly densified so that thermal shock resistance is deteriorated, while greater than 1 mm of spinel grain size causes a deteriorated strength. When magnesia-rich spinel is applied, an amount of added magnesia material may be cut down because magnesia-rich spinel is comprised of magnesia and spinel. In the same manner, an amount of added alumina material may also be cut down because alumina-rich spinel is comprised of alumina and spinel. In this case, even if greater than 60% by weight of spinel is added, no problem is caused because the total amount of alumina in the mixture is never reduced for the reason of adding alumina-rich spinel.

Zirconia has an excellent corrosion resistance against a slag having a low basicity and the characteristic is superior to that of alumina. Thus, an alumina-zirconia-graphite refractory provides an excellent corrosion resistance against a slag having a low basicity, while it provides small effect on improving corrosion resistance against a slag having a high basicity.

A refractory according to the present invention wherein magnesia is added to the aforementioned alumina-zirconia-graphite refractory has an improved thermal shock resistance as well as excellent corrosion resistance against a slag having a high basicity. Thus, the alumina-zirconia-graphite refractory including the added zirconia may widely be applied to both an operation wherein a slag having a low basicity is created and an operation wherein a slag having a high basicity is created.

Any suitable materials including various kinds of zirconia, such as unstabilized fused zirconia, baddeleyite, stabilized zirconia, zirconia-mullite, alumina-zirconia, and zircon, can be applied as zirconia used in the present invention, and it is also possible to add as the combination of these materials. As these refractory materials including zirconia, it may be desirable to have a high purity. In particular, zirconia having 3% or less by weight of the impurity is desirable because of its excellent in corrosion resistance. A mixing rate of zirconia is preferably to be 60% or less by weight. In the case of greater than 60% by weight of zirconia, the amount of alumina is relatively reduced so that insufficient spinel is created by reacting alumina and magnesia and inadequate effect of the present invention can resultingly be obtained. Besides, thermal shock resistance is deteriorated due to a reduced amount of graphite.

Available grain size of zirconia is to be in the range of 0.5$\mu$m to 1 mm. In the case of less than 0.5$\mu$m of zirconia grain size, a texture of the refractory is exceedingly densified so that thermal shock resistance is deteriorated, while greater than 1 mm of zirconia grain size causes a deteriorated strength.

In addition to the aforementioned additives to refractory materials, any known additives may be added in any range without limiting the effect of the present invention. As an example, there are various metals, such as SiC, pitch, $B_4C$. Fused silica may also be combined to additionally improve thermal shock resistance.

The refractory of the present invention may be produced by a common method for producing refractories for continuous casting wherein a commonly used organic binder, such as phenol resin, is added to the mixture comprised of the aforementioned basic components and mixing, shaping and burning are then performed. The burning is performed in the temperature range of 800 to 1300° C. under reduction atmosphere.

BEST MODE FOR CARRYING OUT THE INVENTION

Example 1

An effect of grain size of magnesia added to alumina-graphite material was researched. Table1 shows each composition of tested mixture. No.3 to No.6 show examples of the present invention, and No.1, No.2 and No.7 show comparative examples.

TABLE 1

|  | No. 1 | No. 2 | No. 3 | No. 4 | No. 5 | No. 6 | No. 7 |
| --- | --- | --- | --- | --- | --- | --- | --- |
| Mixture composition weight % | | | | | | | |
| Flake graphite (0.5–1.0 mm) | 25 | 25 | 25 | 25 | 25 | 25 | 25 |
| Fused magnesia* | — | 20 | 20 | 20 | 20 | 20 | 20 |
| Medium grain fused alumina (average 0.2 mm) | 40 | 20 | 20 | 20 | 20 | 20 | 20 |
| Ultra-fine fused alumina (−0.05 mm) | 35 | 35 | 35 | 35 | 35 | 35 | 35 |
| *Magnesia grain size (mm) | — | <0.02 | 0.02–0.05 | 0.05–0.1 | 0.1–0.5 | 0.5–1.0 | 1.0–1.5 |
| Characteristics of product burnt at 1000° C. | | | | | | | |
| Modulus of Rupture (MPa) | 9.0 | 10.3 | 10.0 | 9.5 | 9.2 | 8.8 | 7.4 |
| Elastic modulus (GPa) | 10.2 | 11.2 | 10.9 | 10.5 | 10.3 | 10.0 | 8.8 |
| Thermal expansion coefficient (× $10^{-6}$/° C.) | 4.1 | 4.5 | 4.4 | 4.3 | 4.2 | 4.3 | 4.7 |
| Coefficient of thermal shock resistance | 215 | 204 | 209 | 210 | 213 | 205 | 179 |
| Corrosion resistance (Corrosion index) | 100 | 75 | 74 | 72 | 71 | 71 | 70 |

TABLE 1-continued

|  | No. 1 | No. 2 | No. 3 | No. 4 | No. 5 | No. 6 | No. 7 |
|---|---|---|---|---|---|---|---|
| Characteristics of product after heating at 1550° C. | | | | | | | |
| Modulus of Rupture (MPa) | 10.2 | 13.5 | 11.6 | 11.1 | 10.8 | 10.5 | 8.6 |
| Elastic modulus (GPa) | 13.8 | 17.2 | 12.7 | 11.7 | 11.1 | 10.4 | 9.3 |
| Thermal expansion coefficient ($\times 10^{-6}/°$ C.) | 4.6 | 5.2 | 4.9 | 4.7 | 4.7 | 4.9 | 5.3 |
| Coefficient of thermal shock resistance | 161 | 151 | 186 | 202 | 207 | 206 | 174 |
| Note | | | | | | | |
| C.E.: Comparative Example I.: Present Invention | C.E. | C.E. | I. | I. | I. | I. | C.E. |

Each corrosion rate in the corrosion test is indexed by giving 100 to the melt damage speed of No.1. Smaller figure indicates better corrosion resistance.

Magnesia was prepared by crushing a 98% purity of fused magnesia and then classifying into the grain sizes described in Table 1. An adequate amount of phenol resin was mixed with each mixture material and each resulting mixture was kneaded. The resulting kneaded products were shaped in a nozzle with pressure of 1000 kg/cm$^2$ by CIP (cold isostatic pressing) process. Then, after burying under a coke, the resulting shaped products were burnt at maximum temperature of 1000° C. under reduction atmosphere.

A research result of bending strength, elastic modulus, thermal expansion coefficient, and corrosion resistance of the burnt products is shown in Table1. The modulus of rupture was determined by the three points cross-bending strength test and the elastic modulus was determined by the ultrasonic method. The thermal expansion coefficient was determined by a commercial available dilatometer and was shown by average of coefficient of linear expansion through heating up to 1500° C. The thermal shock resistance was calculated by the following formula because Poisson's ratio was substantially constant. Large figure indicates better thermal shock resistance.

(modulus of rupture)/[(elastic modulus)×(thermal expansion coefficient)]

For determining corrosion resistance, a steel including 0.01% by weight carbon was molten at 1600° C. so that a slag including 35% of CaO, 30% of SiO$_2$, 15% of Al$_2$O$_3$, 10% of MgO and 7% of MnO$_2$ was floated on a surface of the molten steel. Then, a sample having rectangular column shape was immerged in the molten steel for 30 minutes. A melt damage amount at a most melt-damaged portion of the sample was measured. The figure shown in Table 1 is a value indexed by giving 100 to the corrosion rate of No.1. Smaller figure indicates better corrosion resistance.

For researching a quality of the burnt nozzles in reuse, the burnt nozzles were immersed for 8 hours in 1550° C. of molten steel which was molten by a high frequency furnace, followed by being air-cooled. The researched result of modulus of rupture, elastic modulus, thermal expansion coefficient and thermal shock resistance of the nozzles (shown as products after heating at 1550° C. in Table 1) is also shown in the Table.

In view of the characteristics of the products burnt at 1000° C. shown in the Table, it is proved that the examples of the present invention have better thermal shock resistance and corrosion resistance compared to the comparative example, and the thermal shock resistance after heating at 1500° C. has substantially same or less deterioration compared to the value of the products burnt at 1000° C. In contrast, the comparative examples are undesirable because they are inferior in corrosion resistance to the present invention and their thermal shock resistances are largely deteriorated after heating 1550° C. While one comparative example of No.7 is superior in corrosion resistance to the products of the present invention, both of its product burnt at 1000° C. and its product after heating at 1550° C. are inferior in thermal shock resistance to the product of the present invention. Thus, it can be proved that the grain size of magnesia should be in the range of 0.02 mm or more to 1.0 mm or less.

One example will be described, wherein a field trial was performed for an alumina-magnesia-graphite refractory obtained by the present invention. Long nozzles were formed with applying each material of the comparative example No.1 and the present invention's example No.5 to a long nozzle portion corresponding to slag level, and then provided for performing a field trial by using a slab continuous casting machine. A ladle capacity was 310 ton and a casting time per charge was about 45 minutes. Under the reuse condition that one casting operation included 3 to 6 charges, and the long nozzle was detached from the ladle on each completion of one casting operation, followed by completely cooling the long nozzle and using it again after preheating, the casting operations were performed up to three times. The number of tested samples was 10 respectively.

As a result, all of 10 nozzles applying the product of the present invention could perform three casing operations, while one of the conventional nozzles had a crack at an initial stage of second casting operation and other two of the conventional nozzles had a crack at an initial stage of third casting operation.

After three times of casting operations, used long nozzles were collected to research a corrosion rate at the portion corresponding to slag level. As a result, it was proved that the corrosion rate speed of the product obtained by example of the present invention was less about 35% of that of the product obtained by the comparative example. Thus, durability of the long nozzle could be improved by applying the refractory of the present invention to the long nozzle portion corresponding to the slag level.

Example 2

For researching an effect of adding magnesia to an alumina-spinel-graphite material, eight kinds of mixtures shown in Table 2 were prepared. In Table 2, No.4 to No.7 show examples of the present invention. No.1, No.3 and No.8 show comparative examples.

Processing of mixing, shaping and burning, and a test of burnt products on modulus of rupture, elastic modulus and thermal expansion coefficient and so on were performed under the same condition as the example 1.

For determining corrosion resistance, a steel including 0.01% by weight carbon was molten at 1600° C. so that a slag having high basicity and including 45% of CaO, 25% of $SiO_2$, 10% of $Al_2O_3$, 10% of MgO and 7% of $MnO_2$ was floated on a surface of the molten steel. Then, a 20 mm on a side of sample having rectangular column shape was immerged in the molten steel for 30 minutes. A melt damage amount at a most melt-damaged portion of the sample was measured.

example of No.8 is superior in corrosion resistance to the product of the present invention, both of its products burnt at 1000° C. and its product after heating at 1550° C. are inferior in thermal shock resistance to the products of the present invention due to large thermal expansion coefficient of the comparative example. Thus, it could be proved that the amount of added magnesia should be in the range of 3% or more to 60% or less.

It was also proved that a satisfactory thermal shock resistance could be obtained regardless of the amount of magnesia and an excellent corrosion resistance against a slag having high basicity could be obtained by adding spinel to an alumina-magnesia-graphite refractory material.

TABLE 2

|  | No. 1 | No. 2 | No. 3 | No. 4 | No. 5 | No. 6 | No. 7 | No. 8 |
| --- | --- | --- | --- | --- | --- | --- | --- | --- |
| Mixture composition weight % | | | | | | | | |
| Flake graphite (0.5–0.1 mm) | 22 | 22 | 22 | 22 | 22 | 22 | 22 | 22 |
| Fused magnesia (0.5–0.02 mm) | 0 | 2 | 4 | 6 | 15 | 34 | 60 | 70 |
| Fused spinel (–0.2 mm) | 10 | 10 | 10 | 10 | 10 | 10 | 5 | 3 |
| Medium grain fused alumina (0.5–0.05 mm) | 40 | 38 | 37 | 34 | 25 | 6 | 0 | 0 |
| Ultra-fine fused alumina (–0.05 mm) | 28 | 28 | 28 | 28 | 28 | 28 | 13 | 5 |
| Characteristics of product burnt at 1000° C. | | | | | | | | |
| Modulus of Rupture (MPa) | 9.1 | 9.2 | 9.3 | 9.5 | 9.4 | 9.2 | 9.1 | 9.3 |
| Elastic modulus (GPa) | 10.2 | 10.2 | 10.3 | 10.3 | 10.3 | 10.2 | 10.4 | 10.6 |
| Thermal expansion coefficient ($\times 10^{-6}$/° C.) | 4.2 | 4.2 | 4.2 | 4.2 | 4.3 | 4.4 | 4.6 | 4.9 |
| Coefficient of thermal shock resistance | 212 | 215 | 215 | 220 | 212 | 205 | 190 | 179 |
| Corrosion resistance (corrosion index) | 100 | 98 | 95 | 89 | 79 | 68 | 65 | 63 |
| Characteristics of product after heating at 1550° C. | | | | | | | | |
| Modulus of Rupture (MPa) | 10.4 | 10.5 | 10.8 | 10.9 | 11.0 | 10.6 | 10.2 | 9.8 |
| Elastic modulus (GPa) | 14.3 | 14.0 | 13.1 | 12.2 | 11.5 | 10.8 | 10.5 | 10.6 |
| Thermal expansion coefficient ($\times 10^{-6}$/° C.) | 4.7 | 4.7 | 4.7 | 4.7 | 4.8 | 4.9 | 5.2 | 5.9 |
| Coefficient of thermal shock resistance | 155 | 160 | 175 | 190 | 199 | 200 | 187 | 157 |
| Note | | | | | | | | |
| C.E.: Comparative Example I.: Present Invention | C.E. | C.E. | C.E. | I. | I. | I. | I. | C.E. |

Each corrosion rate in the corrosion test is indexed by giving 100 to the melt damage speed of No.1. Smaller figure indicates better corrosion resistance.

Table 2 shows figures which are indexed by giving 100 to the melt damage speed of No.1. Smaller figure indicates better corrosion resistance.

A quality of the burnt refractory in reuse was researched as well as the example 1, and its result is shown in Table 2.

In view of the characteristics shown in the Table, it is proved that the examples No.3 to No.7 of the present invention have better thermal shock resistance and corrosion resistance compared to the comparative examples, and the thermal shock resistance after heating at 1550° C. has substantially same or less deterioration compared to the value of the products burnt at 1000° C. In contrast, the comparative examples No.1 and No.3 are undesirable because they are inferior in corrosion resistance to the present invention and their thermal shock resistances are largely deteriorated due to extremely increased elastic modulus after heating 1550° C. While the comparative One example will be described, wherein a field trial was performed for an alumina-magnesia-spinel-graphite refractory shown in Table 2. Long nozzles were formed with applying each material of the comparative example No.1 and the present invention's example No.5 to a long nozzle portion corresponding to slag level, and then provided for performing a field trial by using a slab continuous casting machine. A ladle capacity was 310 ton and a casting time per charge was about 45 minutes. Under the reuse condition that one casting operation included 3 to 6 charges, and the long nozzle was detached from the ladle on each completion of one casting operation, followed by completely cooling the long nozzle and using it again after preheating, the casting operations were performed up to three times. The number of tested samples was 10 respectively. As a result, all of 10 nozzles applying the refractory of the example according to the present invention could perform three casing operations. However, in the comparative example, two nozzles had a crack at an initial stage of second casting operation and other two had a crack at an initial stage of third casting operation. After three times of casting operations, used long nozzles were collected to research a corrosion rate at the portion corresponding to slag level. As a result, it was proved that the corrosion rate of the example of the present invention was less about 25% of that of the comparative example. Thus, durability of the long nozzle could be improved by applying the product of the present invention to the long nozzle portion corresponding to slag level.

Example 3

This example is the result of researching an effect of adding magnesia to an alumina-zirconia-graphite material. Eight kinds of mixtures shown in Table 3 were used. In Table 3, No.4 to No.7 show examples of the present invention. No.1, to No.3 and No. 8 show comparative examples. Processing of mixing, shaping and burning, and an evaluation of modulus of rupture, elastic modulus and thermal expansion coefficient were performed, as is the case with the example 1. An evaluation of corrosion resistance was performed by using a slag having high basicity, as is the case with the example 2. This result is shown in Table 3.

A quality of the burnt refractory in reuse was researched as well as the example 1, and its result is shown in Table 4.

In view of the characteristics shown in the Table, it is proved that the examples No.3 to No.7 of the present invention have better thermal shock resistance and corrosion resistance compared to the comparative examples, and the thermal shock resistance after heating at 1550° C. has substantially same or less deterioration compared to the value of the products burnt at 1000° C. In contrast, the comparative examples No.1 and No.3 are undesirable because they are inferior in corrosion resistance to the example of the present invention and their thermal shock resistances are largely deteriorated due to extremely increased elastic modulus after heating 1550° C. While the comparative example No.8 is superior in corrosion resistance to the example of the present invention, the comparative example is undesirable because both of its product burnt at 1000° C. and its product after heating at 1550° C. are extremely inferior in thermal shock resistance to the example of the present invention due to large thermal expansion coefficient of the comparative example. Thus, it could be proved that the amount of added magnesia should be in the range of 6% or more to 60% or less.

It was also proved that an excellent corrosion resistance could be obtained against a slag being high-low basicity by adding zirconia to an alumina-magnesia-graphite refractory material.

TABLE 3

| | No. 1 | No. 2 | No. 3 | No. 4 | No. 5 | No. 6 | No. 7 | No. 8 |
|---|---|---|---|---|---|---|---|---|
| Mixture composition weight % | | | | | | | | |
| Flake graphite (0.5–0.1 mm) | 22 | 22 | 22 | 22 | 22 | 22 | 22 | 22 |
| Fused magnesia (0.5–0.02 mm) | 0 | 2 | 3 | 6 | 15 | 34 | 60 | 70 |
| Fused zirconia (CaO stabilized) (−0.1 mm) | 10 | 10 | 10 | 10 | 10 | 10 | 5 | 3 |
| Medium grain fused alumina (0.5–0.05 mm) | 40 | 38 | 37 | 34 | 25 | 6 | 0 | 0 |
| Ultra-fine fused alumina (−0.05 mm) | 28 | 28 | 28 | 28 | 28 | 28 | 13 | 5 |
| Characteristics of product burnt at 1000° C. | | | | | | | | |
| Modulus of rupture (MPa) | 9.2 | 9.3 | 9.4 | 9.6 | 9.5 | 9.3 | 9.2 | 9.4 |
| Elastic modulus (GPa) | 11.2 | 11.2 | 11.3 | 11.3 | 11.3 | 11.2 | 11.4 | 11.6 |
| Thermal expansion coefficient ($\times 10^{-6}/°$ C.) | 4.0 | 4.0 | 4.0 | 4.0 | 4.1 | 4.2 | 4.4 | 4.7 |
| Coefficient of thermal shock resistance | 205 | 208 | 208 | 212 | 205 | 198 | 183 | 172 |
| Corrosion resistance (Corrosion index) | 100 | 96 | 93 | 87 | 77 | 66 | 63 | 61 |
| Characteristics of product after heating at 1550° C. | | | | | | | | |
| Modulus of rupture (MPa) | 10.7 | 10.8 | 11.1 | 11.2 | 11.3 | 10.9 | 10.5 | 10.1 |
| Elastic modulus (GPa) | 15.3 | 15.0 | 14.1 | 13.2 | 12.5 | 11.8 | 11.8 | 11.6 |
| Thermal expansion coefficient ($\times 10^{-6}/°$ C.) | 4.6 | 4.6 | 4.6 | 4.6 | 4.7 | 4.8 | 5.1 | 5.8 |
| Coefficient of thermal shock resistance | 152 | 157 | 171 | 184 | 192 | 192 | 174 | 150 |
| Note | | | | | | | | |
| C.E.: Comparative Example I.: Present Invention | C.E. | C.E. | C.E. | I. | I. | I. | I. | C.E. |

Each corrosion rate in the corrosion test is indexed by giving 100 to the melt damage speed of No.1. Smaller figure indicates better corrosion resistance.

One example will be described, wherein a field trial was performed for an alumina-magnesia-zirconia-graphite refractory. Long nozzles were formed with applying each material of the comparative example No.1 and the present invention's example No.5 shown in Table 3 to a long nozzle portion corresponding to slag level, and then provided for performing a field trial by using a slab continuous casting machine, as is the case with the examples 1 and 2. As a result, all of 10 nozzles applying the refractory of the example according to the present invention could perform three casing operations. However, one of the nozzles applying the comparative example had a crack at an initial stage of second casting operation and other two nozzles had a crack at an initial stage of third casting operation. After three times of casting operations, used long nozzles were collected to research a corrosion rate at the portion corresponding to slag level. As a result, it was proved that corrosion rate of the example of the present invention was less about 25% of that of the comparative example. Thus, durability of the long nozzle could be improved by applying the refractory of the present invention to the long nozzle portion corresponding to slag level.

INDUSTRIAL APPLICABILITY

The alumina-magnesia-graphite refractory of the present invention is exceptionally excellent in thermal shock resistance and corrosion resistance not only in initial burnt product but also in the condition after heating in actual operation, whereby submerged nozzles, long nozzles and long stoppers excellent in durability under reuse or intermittent use condition can be achieved.

What is claimed is:

1. An alumina-magnesia-graphite refractory obtained by mixing, shaping and burning a mixture comprising:

10 to 72% by weight of alumina material;

22 to 40% by weight of graphite material; and 6 to 34% by weight of magnesia material having a grain size in a range of 0.02 mm to 1.0 mm.

2. An alumina-magnesia-graphite refractory according to claim 1, wherein said mixture is comprised predominantly of alumina and graphite and includes spinel.

3. An alumina-magnesia-graphite refractory according to claim 1, wherein said mixture is comprised predominantly of alumina and graphite and includes zirconia.

* * * * *